United States Patent
Harris

(10) Patent No.: US 9,316,282 B1
(45) Date of Patent: Apr. 19, 2016

(54) ENERGY ABSORBING APPARATUSES, SYSTEMS AND METHODS OF MAKING AND USING THE SAME

(71) Applicant: Angel 7 Industries, LLC, San Antonio, TX (US)

(72) Inventor: Kerry S. Harris, San Antonio, TX (US)

(73) Assignee: Angel 7 Industries, LLC, San Antonio, TX (US)

( * ) Notice: Subject to any disclaimer, the term of this patent is extended or adjusted under 35 U.S.C. 154(b) by 70 days.

(21) Appl. No.: 14/279,548

(22) Filed: May 16, 2014

(51) Int. Cl.
| | |
|---|---|
| *F16F 11/00* | (2006.01) |
| *F16F 7/00* | (2006.01) |
| *F16M 3/00* | (2006.01) |
| *F16F 15/04* | (2006.01) |
| *F16F 13/00* | (2006.01) |

(52) U.S. Cl.
CPC . *F16F 7/00* (2013.01); *F16F 13/00* (2013.01); *F16F 15/04* (2013.01)

(58) Field of Classification Search
CPC ............ F16F 7/00; F16F 13/00; F16F 15/00; F16F 15/02; F16F 15/022; F16F 15/04; F16F 2238/04
USPC ...................... 267/136, 140.11, 140.3, 140.4; 248/562, 636, 638
See application file for complete search history.

(56) References Cited

U.S. PATENT DOCUMENTS

| | | | | |
|---|---|---|---|---|
| 2,968,818 | A * | 1/1961 | Petersen | A47C 19/025 248/584 |
| 3,741,512 | A * | 6/1973 | Olsson | B65G 1/07 108/136 |
| 4,981,215 | A * | 1/1991 | Ilic | B60P 7/16 206/320 |
| 5,149,066 | A * | 9/1992 | Snaith | F16F 7/14 248/636 |
| 6,012,162 | A * | 1/2000 | Bullat | A41D 13/018 2/2.5 |
| 7,125,008 | B2 * | 10/2006 | Hayashi | F16F 15/0232 267/136 |
| 2001/0052141 | A1 * | 12/2001 | Andersen | A41D 19/01511 2/2.5 |
| 2010/0140854 | A1 * | 6/2010 | Aveni | A43B 13/14 267/136 |
| 2012/0137541 | A1 * | 6/2012 | Yeo | A43B 13/182 36/27 |

* cited by examiner

*Primary Examiner* — Melody Burch
(74) *Attorney, Agent, or Firm* — Scherrer Patent & Trademark Law, P.C.; Stephen T. Scherrer; Monique A. Morneault

(57) ABSTRACT

The present invention relates to an energy absorbing apparatus. Specifically, the apparatus comprises a first disk and a second disk atop the first disk, and a plurality of collapsible arms around the perimeter of the disks connecting the first disk and the second disk, and an elastic material disposed between at least two of the collapsible arms, wherein collapsing of the arms causes the elastic material to stretch, storing kinetic energy from the vertical direction as potential energy in the horizontal direction, wherein release of the potential energy from the elastic material causes the arms to return to an uncollapsed state. Systems utilizing the energy absorbing apparatus, methods of making and methods of using the same are further provided.

12 Claims, 4 Drawing Sheets

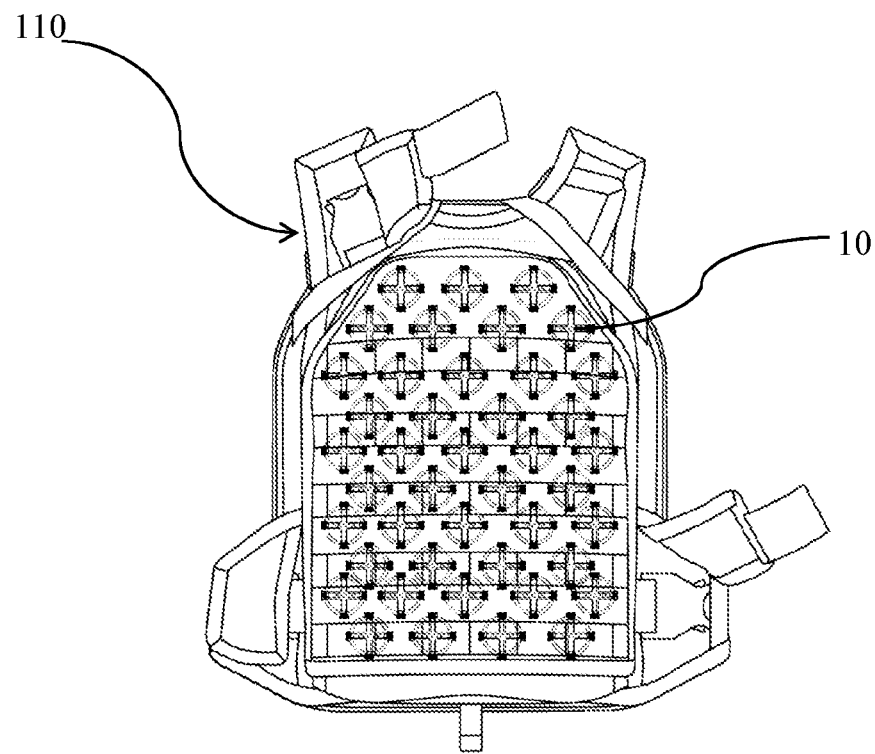
FIG. 5
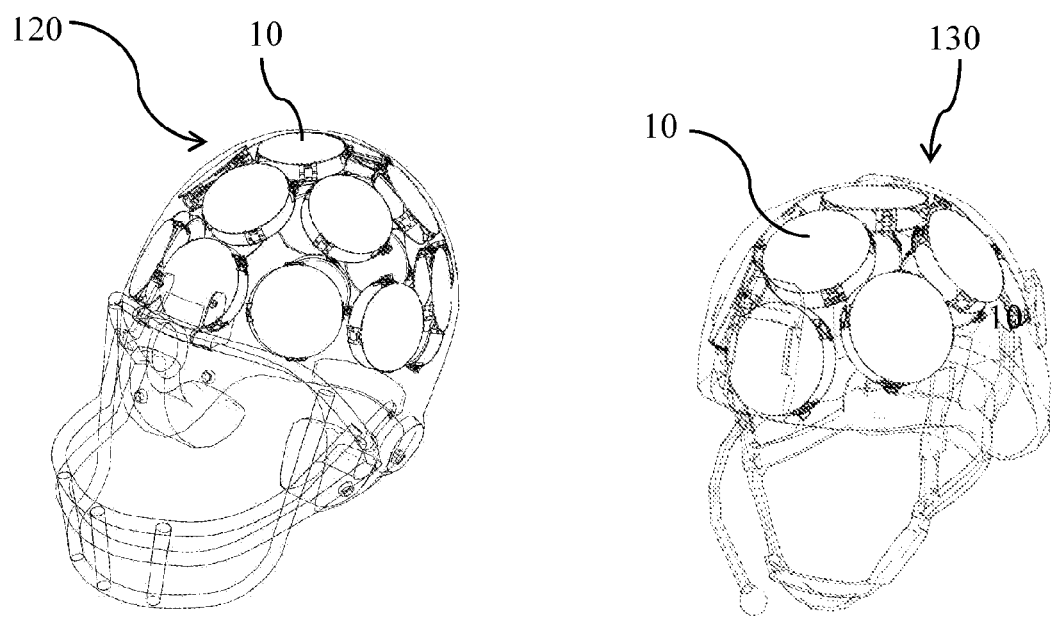
FIG. 6
FIG. 7

** ENERGY ABSORBING APPARATUSES, SYSTEMS AND METHODS OF MAKING AND USING THE SAME

TECHNICAL FIELD

The present invention relates to an energy absorbing apparatus. Specifically, the apparatus comprises a first disk and a second disk atop the first disk, and a plurality of collapsible arms around the perimeter of the disks connecting the first disk and the second disk, and an elastic material disposed between at least two of the collapsible arms, wherein collapsing of the arms causes the elastic material to stretch, storing kinetic energy in the horizontal or lateral direction as potential energy, wherein release of the potential energy from the elastic material causes the arms to return to an uncollapsed state. Systems utilizing the kinetic energy absorbing apparatus, methods of making and methods of using the same are further provided.

BACKGROUND

Various materials have been used as energy absorbing materials throughout history. Energy absorbing materials can be traced back to armor used in warfare and in other various applications. A typical and early energy absorbing material for armor was leather, although other materials, such as metals and combinations of metals, fabrics, leathers, and other like materials have been used in armor applications to absorb energy from a strike or blow.

Leather had been used as a standard energy absorbing material into the twentieth century, and was used to make body armor and helmets, including football helmets. Indeed, leather had been used as standard energy absorbing materials in the National Football League when players started adopting helmets for use in games, although the mandating of the use of helmets did not occur until many years after the start of the NFL. Better energy absorbing materials have been developed over time for many different applications requiring energy absorption, including combinations of leather and pads, plastics, and air and fluid-filled bladders. Modern era plastics and foams have been utilized for many years as energy absorbing materials, including, for example, Kevlar®, thermoplastic or thermoset foams, and other thermoplastic and thermoset materials have been developed.

It is often difficult to utilize an effective energy absorbing material that is relatively lower profile. In other words, effective energy absorbing materials typically are bulky and difficult to incorporate into armor, helmets, and other applications, especially in applications where space is constrained. Generally, the rule is that the bulkier the material, the better the energy absorbing qualities. However, the bulkier the material, the more difficult it may be for a user to maneuver effectively. For example, in armor and/or helmets, such as for military personnel or football players, bulkier pads and helmets decrease the ability of users to move effectively, slowing them down and making them less able to replicate complex moves during battle or game-day conditions. A need, therefore, exists for energy absorbing apparatuses that reduce the overall size of the articles they are incorporated in, such as armor or helmets. Specifically, a need exists for energy absorbing apparatuses that may easily be incorporated into the applications without compromising energy absorbing properties.

Foams and other like materials are often used in energy absorbing applications. Foam is typically made by introducing air or another gas into a thermoplastic or thermoset material, forming a material with tiny gas-filled open or closed cells disposed throughout the material. In some cases, foams can retain a memory such that the foams absorb an amount of energy and then return to their original shapes, releasing stored potential energy as kinetic energy in the process. In other cases, foams merely deflect upon receiving energy, such as a blow or impact, without returning to their original shape or position. Typically, a foam that destructively absorbs energy may be a better energy absorbing material than a foam that returns to its original shape. However, a foam that destructively absorbs energy can only be used once. Moreover, foams typically dissipate energy by compressing, which merely attempts to "slow down" the impact in the vertical direction. A need exists for energy absorbing apparatuses that dissipate energy from the vertical direction by translating the energy to the horizontal direction, and therefore to prevent energy from transferring vertically to a user or an object.

It can be advantageous for a foam to return to its normal shape, size and/or position after absorbing energy from an impact so that the foam can effective "reset", allowing the foam to receive additional energy. However, it is often difficult for a foam to quickly and efficiently return to its original shape. Moreover, in many cases, foams do not return completely to their original shapes, sizes and/or positions, making them less effective to absorb the next blow or impact. A need, therefore, exists for energy absorbing apparatuses that quickly and efficiently return to their normal position after receiving a blow or impact. Specifically, a need exists for energy absorbing apparatuses that provide a large amount of energy absorption, but can be used more than once. More specifically, a need exists for energy absorbing apparatuses that can effectively reset themselves after a blow or an impact to be ready to receive another blow or impact.

Foams also suffer because they may retain heat, which may be undesirable in certain applications, such as in military applications or for athletes. A need, therefore, exists for an energy absorbing apparatuses that do not retain heat. Oftentimes, certain materials, such as foams and the like, may be dissolvable in water, which may limit their applications. A need exists for an energy absorbing apparatuses that are waterproof.

SUMMARY OF THE INVENTION

The present invention relates to an energy absorbing apparatus. Specifically, the apparatus comprises a first disk and a second disk atop the first disk, and a plurality of collapsible arms around the perimeter of the disks connecting the first disk and the second disk, and an elastic material disposed between at least two of the collapsible arms, wherein collapsing of the arms causes the elastic material to stretch, storing kinetic energy in the vertical direction as potential energy in the horizontal direction, wherein release of the potential energy from the elastic material causes the arms to return to an uncollapsed state. Systems utilizing the kinetic energy absorbing apparatus, methods of making and methods of using the same are further provided.

To this end, in an embodiment of the present invention, an energy absorbing apparatus is provided. The energy absorbing apparatus comprises a first planar element and a second planar element, the first planar element disposed adjacent to and in face-to-face relation with the second planar element; a plurality of bendable arms, each of the bendable arms connected between the first planar element and the second planar element, such that movement of the first planar element toward the second planar element causes the arms to bend outwardly; and an energy storage element connected between the plurality of arms and sandwiched between the first and second planar elements, the energy storage element storing kinetic energy as potential energy when the first planar element moves toward the second planar element, the stored potential energy transforming into kinetic energy to move the first planar element away from the second planar element.

In an embodiment, the energy storage element is an elastic band.

In embodiment, the energy storage element is a spring.

In an embodiment, the energy storage element is attached to each of the arms, such that when the arms bend outwardly, the energy absorbing material stretches, storing potential energy.

In an embodiment, the energy storage element extends through each of the arms and is attached to the outside surface of each of the arms.

In an embodiment, each of the arms is pivotally connected to both the first planar element and the second planar element.

In an embodiment, the arms are pivotally connected at or near the perimeter of the first and second planar elements.

In an embodiment, the first planar element is a first disk and the second planar element is a second disk, and further wherein the energy absorbing element is an elastic band, said apparatus further comprising at least two outwardly bendable arms, said elastic band connected to each of the outwardly bendable arms for stretching when the outwardly bendable arms bend outwardly.

In an embodiment, the apparatus comprises at least four arms disposed equidistantly around and pivotally connected to the perimeters of the first and second disks.

In an embodiment, the elastic band is disposed through each arm and attached to an outside surface of each arm.

In an alternate embodiment of the present invention, a system for absorbing energy is provided. The system comprises an article; and at least one energy absorbing apparatus disposed on or within the article comprising a first planar element and a second planar element, the first planar element disposed adjacent to and in face-to-face relation with the second planar element, a plurality of bendable arms, each of the bendable arms connected between the first planar element and the second planar element, such that movement of the first planar element toward the second planar element causes the arms to bend outwardly, and an energy storage element connected between the plurality of arms and sandwiched between the first and second planar elements, the energy storage element storing kinetic energy as potential energy when the first planar element moves toward the second planar element, the stored potential energy transforming into kinetic energy to move the first planar element away from the second planar element.

In an embodiment, the article is selected from the group consisting of footwear, a vest, a helmet, and a case for protecting electronic devices.

In an embodiment, the plurality of energy absorbing apparatuses is disposed within the article.

In an embodiment, the article comprises an outer layer of material, and inner layer of material, and the plurality of apparatuses are disposed between the outer and inner layers of material.

In an embodiment, the article comprises an energy absorbing material.

In an embodiment, the energy absorbing material is an energy absorbing foam.

In an embodiment, the outer material is a bullet proof material.

In an embodiment, the outer layer of material is a rigid material, and the inner layer of material is a padded material.

In an alternate embodiment of the present invention, a system for absorbing energy is provided. The system comprises: a first energy absorbing apparatus comprising a first planar element and a second planar element, the first planar element disposed adjacent to and in face-to-face relation with the second planar element, a plurality of bendable arms, each of the bendable arms connected between the first planar element and the second planar element, such that movement of the first planar element toward the second planar element causes the arms to bend outwardly, and an energy storage element connected between the plurality of arms and sandwiched between the first and second planar elements, the energy storage element storing kinetic energy as potential energy when the first planar element moves toward the second planar element, the stored potential energy transforming into kinetic energy to move the first planar element away from the second planar element; a second energy absorbing apparatus comprising a first planar element and a second planar element, the first planar element disposed adjacent to and in face-to-face relation with the second planar element, a plurality of bendable arms, each of the bendable arms connected between the first planar element and the second planar element, such that movement of the first planar element toward the second planar element causes the arms to bend outwardly, and an energy storage element connected between the plurality of arms and sandwiched between the first and second planar elements, the energy storage element storing kinetic energy as potential energy when the first planar element moves toward the second planar element, the stored potential energy transforming into kinetic energy to move the first planar element away from the second planar element; and a bridging member extending between the first and second energy absorbing apparatuses.

In an embodiment, the bridging member comprises a hinge element for allowing the bridging element to bend.

It is, therefore, an advantage and objective of the present invention to provide energy absorbing apparatuses that reduce the overall size of the articles in which they are incorporated, such as armor or helmets.

Specifically, it is an advantage and objective of the present invention to provide energy absorbing apparatuses that may easily be incorporated into the applications without compromising energy absorbing properties.

Moreover, it is an advantage and objective of the present invention to provide energy absorbing apparatuses that dissipate energy in the vertical direction by translating it to the horizontal direction, and therefore to prevent energy from transferring vertically to a user or an object.

Further, it is an advantage and objective of the present invention to provide energy absorbing apparatuses that quickly and efficiently return to their normal position after receiving a blow or impact.

Specifically, it is an advantage and objective of the present invention to provide energy absorbing apparatuses that provide a large amount of energy absorption, but may be used more than once.

More specifically, it is an advantage and objective of the present invention to provide energy absorbing apparatuses that can effectively reset themselves after a blow or an impact to be ready to receive another blow or impact.

Further, it is an advantage and objective of the present invention to provide energy absorbing apparatuses that do not retain heat.

Still further, it is an advantage and objective of the present invention to provide energy absorbing apparatuses that are waterproof.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 illustrates a perspective view military vest having a plurality of energy absorbing apparatuses therein in an embodiment of the present invention.

FIG. 6 illustrates a perspective view of a football helmet having a plurality of energy absorbing apparatuses therein in an embodiment of the present invention.

FIG. 7 illustrates a perspective view of a military helmet having a plurality of energy absorbing apparatuses therein in an embodiment of the present invention.

DETAILED DESCRIPTION OF THE PRESENTLY PREFERRED EMBODIMENTS

The present invention relates to an energy absorbing apparatus. Specifically, the apparatus comprises a first disk and a second disk atop the first disk, and a plurality of collapsible arms around the perimeter of the disks connecting the first disk and the second disk, and an elastic material disposed between at least two of the collapsible arms, wherein collapsing of the arms causes the elastic material to stretch, storing kinetic energy from the vertical direction as potential energy in the horizontal direction, wherein release of the potential energy from the elastic material causes the arms to return to an uncollapsed state. Systems utilizing the energy absorbing apparatuses, methods of making and methods of using the same are further provided.

Figure 1:
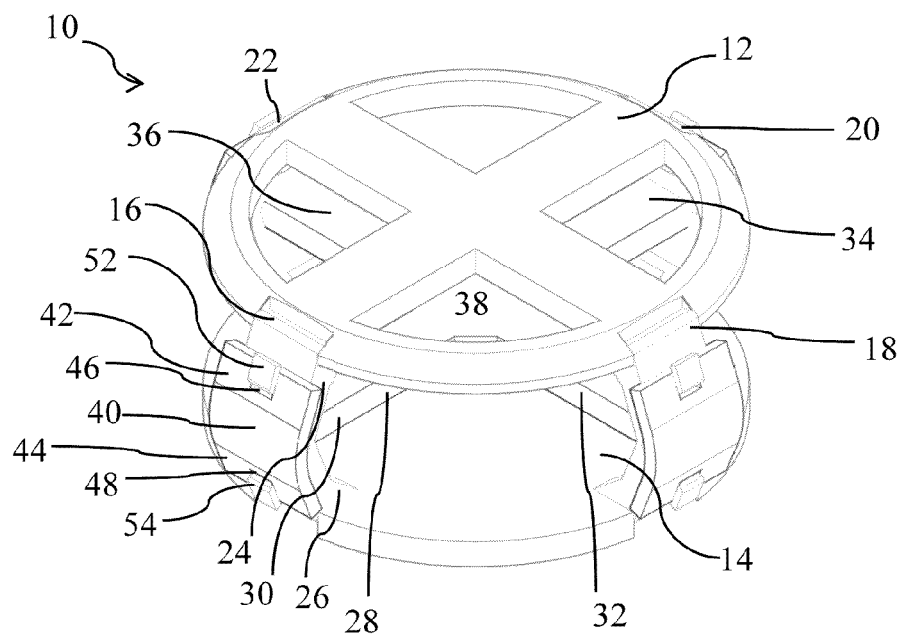
FIG. 1 illustrates a perspective view of an energy absorbing apparatus in an embodiment of the present invention.

Now referring to the figures, wherein like numerals refer to like parts, FIG. 1 illustrates a perspective view of an energy absorbing apparatus 10 in an embodiment of the present invention. The energy absorbing apparatus 10 comprises a first disk 12 adjacent to and disposed above a second disk 14, and a plurality of collapsible arms 16, 18, 20, 22 disposed and pivotally connected to a periphery of the first disk 12 and the second disk 14. Specifically, each of the arms 16, 18, 20, 22 has a first end that is pivotally connected to the perimeter or in proximity to the perimeter of the first disk 12, and further each of the arms 16, 18, 20, 22 has a second end that is pivotally connected to the perimeter or in proximity to the perimeter of the second disk 14, thereby connecting the first disk 12 to the second disk 14 such that the arms 16, 18, 20, 22 act as bridging members between them.

Figure 2:
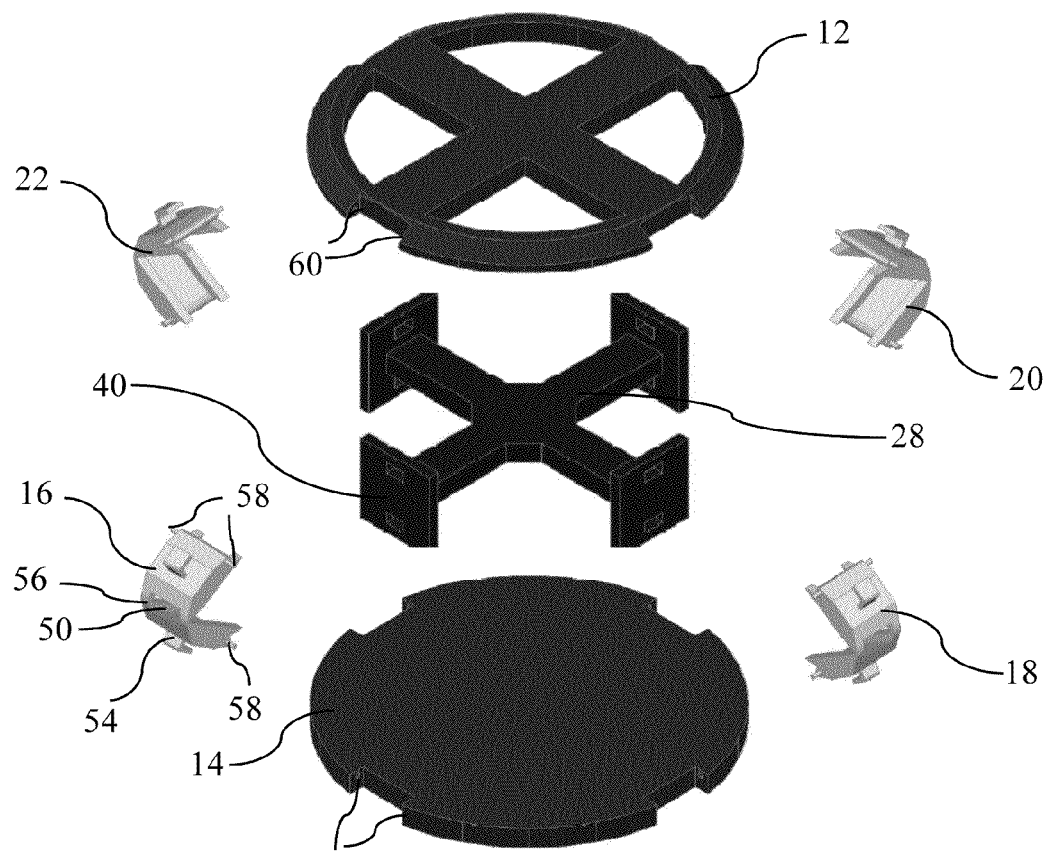
FIG. 2 illustrates an exploded view of an energy absorbing apparatus in an embodiment of the present invention.

Each of the arms 16, 18, 20, 22 may have a bend, hinge, slot, or other like feature that allows the arms 16, 18, 20, 22 to bend outwardly relative to the apparatus 10. As illustrated in FIG. 2, each of the arms 16, 18, 20, 22 may have a hinge 56 disposed at or near a midpoint between the first and second ends of the arms 16, 18, 20, 22 so that each is outwardly bendable. Further, as illustrated in FIG. 2, the ends of the arms 16, 18, 20, 22 may be pivotally connected to the first and second disks 12, 14, respectively. Specifically, in an embodiment, each of the arms 16, 18, 20, 22 may have pins 58 that extend from the first and second ends thereof to engage pinholes 60 disposed in the first and second disks 12, 14 so that the ends of the arms 16, 18, 20, 22 can freely rotate when disposed therein. Thus, when the arms 16, 18, 20, 22 connect the first and second disks 12, 14 together, the first and second disks 12, 14 may move toward or away from each other via bending of the arms 16, 18, 20, 22 and the pivoting of the ends of the arms 16, 18, 20, 22 relative to the disks 12, 14.

The first and second disks 12, 14 may be made from a resilient material, such as a plastic, metal, wood, composite, or any other material. Although the disks 12, 14 are described and shown as disks, or approximate the shape of disks, it should be noted that the disks 12, 14 may preferably be planar elements, and may be any shape, such as square, rectangular, triangular, other polygonal, round, oval, "X"-shaped (as shown in the figures), or any other shape, and the invention should not be limited as described herein. No matter the shape, the arms may be pivotally connected thereto at or near the perimeter thereof. Although the present invention shows four arms connecting the first disk 12 to the second disk 14, any number of arms may be utilized.

An elastic band 28 may be disposed sandwiched between the first and second disks 12, 14 having a central portion 38 and a plurality of legs 30, 32, 34, 36 extending from the central portion to form, generally, an "X" shape. A tab 40 may extend perpendicularly from each of the legs on each terminal end thereof. Each of the tabs may have a first tab element 42 extending upwardly from each of the legs 30, 32, 34, 36 and a second tab element 44 extending downwardly from each of the legs 30, 32, 34, 36. Tab element 42 may have an aperture 46 therein and tab element 44 may have an aperture 48 therein. As shown in FIG. 1, each of the legs 30, 32, 34, 36 may extend through an aperture 50 disposed at or near the hinge 56 of each of the arms 16, 18, 20, 22, and tab elements 42, 44 may extend upwardly and downwardly, respectively along the outside surface of each of the arms 16, 18, 20, 22. A first hook 52 may extend from an upper portion of each of the arms 16, 18, 20, 22 and a second hook 54 may extend from a lower portion of each of the arms 16, 18, 20, 22, the hooks 52, 54 engaging the apertures 46, 48, respectively, on the tab elements 42, 44 of the tab 40. Therefore, the hooks 52, 54 hold the tab 40 in place on the outside surface of each of the arms 16, 18, 20, 22.

The elastic band 28 may thus extend from arm to arm between the first and second disks 12, 14. When disposed in the apparatus 10, the elastic band may be stretched to engage each of the arms 16, 18, 20, 22, as described herein, and the force imparted as the elastic band 28 attempts to return to its unstretched state may keep the arms 16, 18, 20, 22 pulled inwardly, forcing each of the arms 16, 18, 20, 22 to straighten, and force the first disk 12 and the second disk 14 away from each other. A first stop 24 on a first end of each of the arms 16, 18, 20, 22 and a second stop 26 on a second end of each of the arms 16, 18, 20, 22 may prevent the arms from overextending as they straighten due to the force imparted by the elastic band 28.

Figure 3:
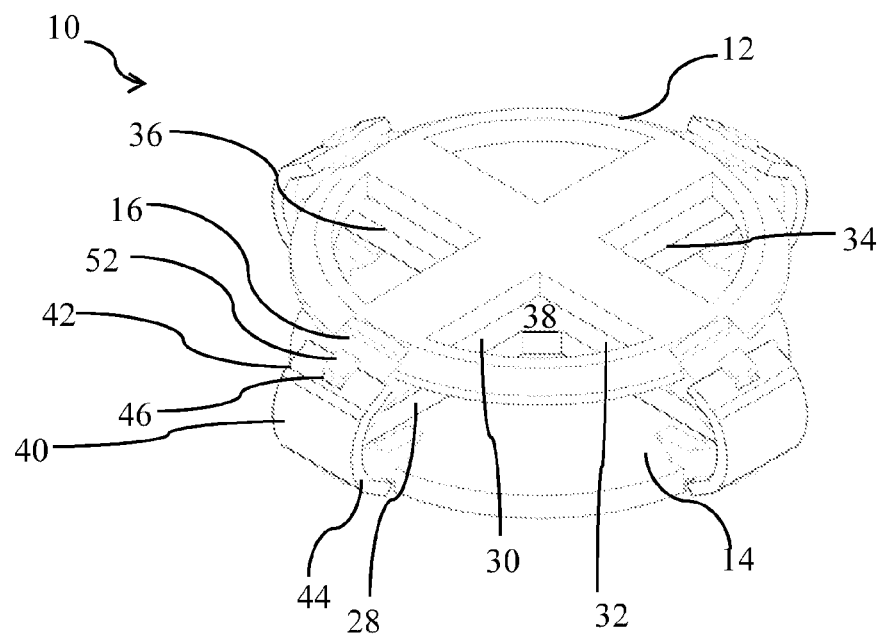
FIG. 3 illustrates a perspective view of an energy absorbing apparatus in a collapsed state in an embodiment of the present invention.

When a vertical force is applied to the first disk 12 downwardly, the second disk 14 upwardly, or to both the first and second disks 12, 14 downwardly and upwardly, respectively, the force may cause the arms 16, 18, 20, 22 to bend outwardly, increasing the stretch of each of the legs 30, 32, 34, 36 of the elastic band 28 within the apparatus 10, as illustrated in FIG. 3. Thus, the vertical force or forces applied to the disks 12, 14 may transform into potential energy stored within the elastic band 28 as the disks 12, 14 move toward each other. When the force decreases or ceases, the potential energy stored in the elastic band 28 is released as kinetic energy as the elastic band 28 attempts to return to its original shape, pulling the arms 16, 18, 20, 22 inwardly and upright, pushing the first disk 12 and the second disk 14 away from each. Thus, when the vertical force applied to the apparatus 10 decreases or ceases, the apparatus may effective reset, allowing the apparatus to be ready to absorb further energy applied thereto.

The kinetic energy absorbed the present invention may be delivered to the apparatus via any means, such as via hitting, striking via a striking force, acoustically transferring energy thereto, or any other like energy transfer. In particular embodiments, some of which are disclosed herein, one or more energy absorbing apparatus 10 may be incorporated into an article of clothing, within a helmet, within armor, within protective cases for electronic devices, within shoes, or within any other device or article to absorb energy that may be applied thereto, including, but not limited to, cushions for artificial limbs, shock absorbers for vehicles, such as bicycles, motorcycles, automobiles, and the like, shock absorbers for canes, crutches or walkers, energy absorbers for flooring, such as beneath wood flooring, carpeting, tile, or other like flooring materials. Specifically, the apparatuses 10 of the present invention may be sandwiched between layers of material, fabric, rigid materials such as plastic, metal, wood, padding, foams, Kevlar®, and other like materials. Moreover, the energy absorbing apparatuses 10 may be utilized in combination with other energy absorbing or protective materials. For example, a bullet proof vest made from layers of Kevlar® may include, incorporated within the bullet proof vest, a plurality of apparatuses 10 to absorb energy from a bullet or the like.

The elastic band 28 may have any degree of stretch and/or strength required for any particular application, and the degree of stretch may be controlled by the material used, thickness of the material, and other like physical factors. All parts of the present invention are replaceable if damaged. For example, if an elastic band 28 breaks during usage, it may be removed and replaced by a replacement elastic band. Moreover, if a user desires to have more or less stretch, depending on the particular application, the user may swap an elastic band of one stretch with an elastic band of another stretch, as needed. Moreover, although the present invention includes an elastic band to transform the kinetic energy into potential energy, any other energy storage material may be utilized, such as, for example, a spring or the like. Depending on the application desired, any size, shape, number of energy absorbing apparatuses, strength, stretchability, or other like parameters, may be utilized as apparent to one of ordinary skill in the art.

The apparatuses 10 of the present invention may be made from material that restricts the flow of heat and/or cold, or even electricity therethrough. Specifically, the apparatuses 10 of the present invention may be made from thermoplastic or thermoset materials, and the elastic band 28 may be made from a thermoplastic urethane material. These materials may reduce or restrict the movement of heat energy or electrical energy, as desired.

Figure 4:
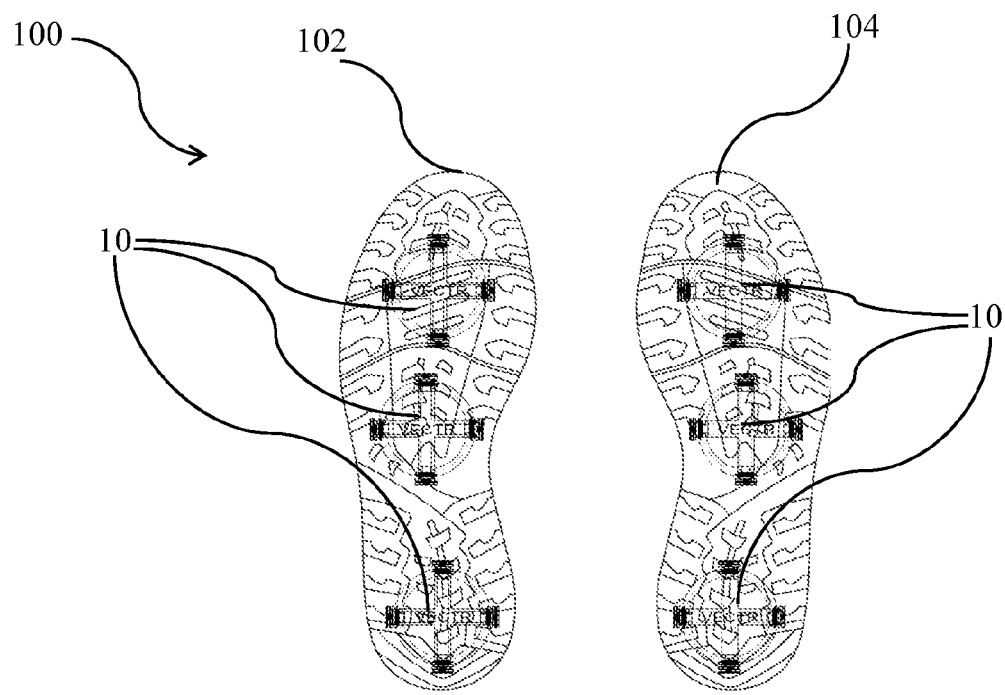
FIG. 4 illustrates a bottom view of a pair of shoes having energy absorbing apparatuses therein in an embodiment of the present invention.

FIGS. 4-7 illustrate several embodiments of the present invention in articles that may be used to protect a user. These are merely exemplary applications, and the invention should not be limited as described herein, as the energy absorbing apparatuses 10 may be utilized in any application requiring energy absorption for protection of a user or another article. Specifically, FIG. 4 illustrates a system 100 comprising a pair of shoes 102, 104, each having a plurality of energy absorbing apparatuses 10 disposed within the soles of each. Thus, the apparatuses 10 may absorb the shock imparted to the shoes by a user walking or running in the shoes 102, 104. Thus, at each step taken by a user, the energy transferred through the soles of the shoes 102, 104 may be absorbed by the apparatuses 10 disposed therein.

FIG. 5 illustrates a military vest 110 having a plurality of apparatuses 10 disposed therein in a pattern of apparatuses 10 so that nearly the entire area of the vest 110 may be covered with energy absorbing apparatuses 10. Thus, the entirety of the area of the vest may have the ability to absorb energy from a blow, explosion, bullet, etc. As noted above, bullet proof material, such as Kevlar®, may be incorporated on the outside of the vest 110 to help protect the user, providing a certain degree of energy absorption, while the apparatuses 10 disposed therein provide further protection.

FIGS. 6 and 7 illustrate examples of helmets that may utilize energy absorbing apparatuses of the present invention. Specifically, FIG. 6 includes a plurality of apparatuses 10 disposed within a football helmet 120, and FIG. 7 illustrates a plurality of apparatuses 10 disposed within a military helmet 130. In both examples, a rigid, resilient material, such as plastic or metal, may form an outside layer, with foam, padding, and other like material forming an inside layer that may contact a user's head. The apparatuses 10 may be sandwiched therein, but providing significant energy absorption from blows and strikes, such as from other football players (in the football helmet application of FIG. 6), or from blows, explosions, bullets, etc., in military applications, as shown in FIG. 7.

Figure 8:
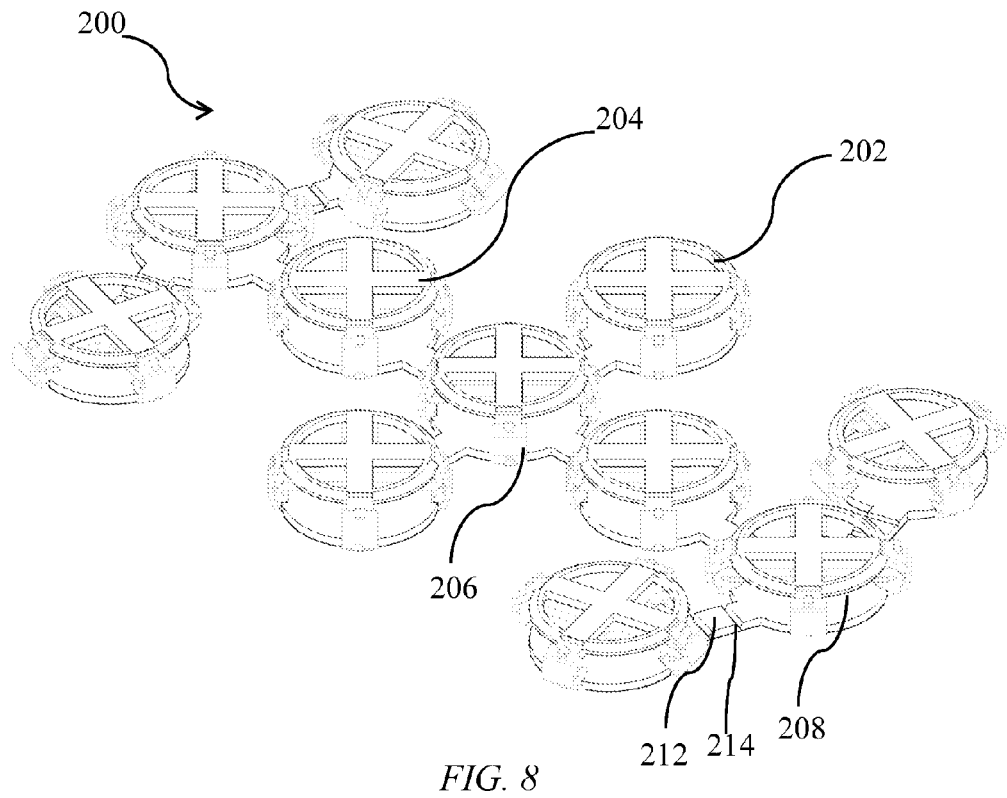
FIG. 8 illustrates a perspective view of a system of a plurality of interconnected energy absorbing apparatuses in an embodiment of the present invention.
Figure 9:
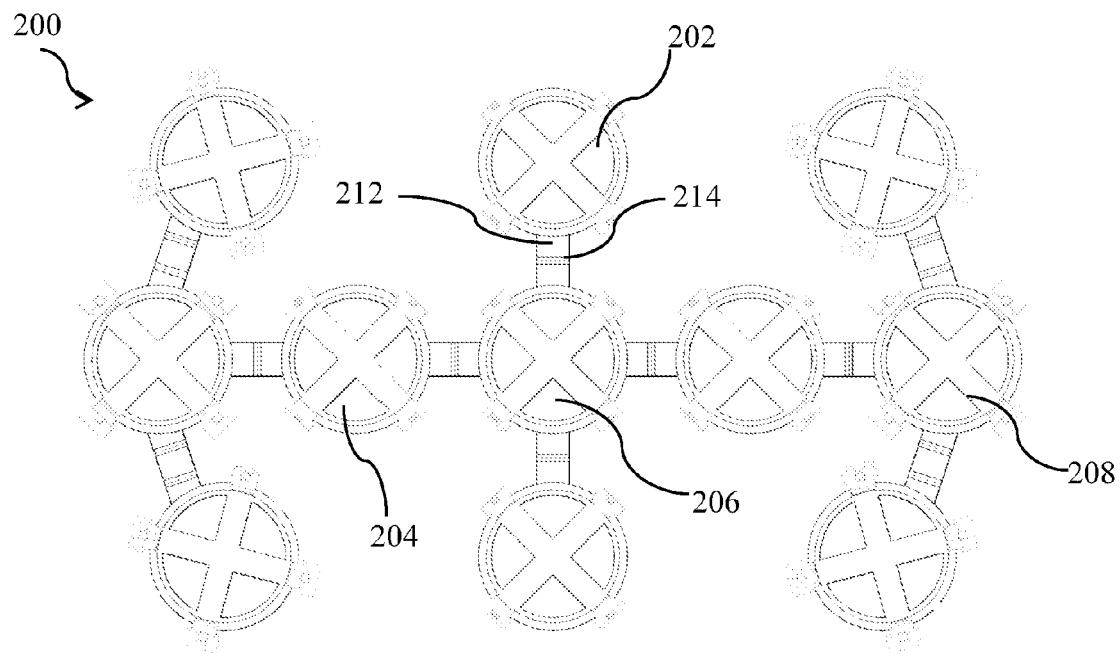
FIG. 9 illustrates a top view of a system of a plurality of interconnected energy absorbing apparatuses in an embodiment of the present invention.

Referring now to FIGS. 8 and 9, a system 200 of a plurality of energy absorbing units is shown and described herein. Specifically, the system 200 may include energy absorbing units that may be interconnected together via bridging members 212. Specifically, bridging members may extend from the bottom disks of each energy absorbing unit to connect units to each other, although it should be noted that this is merely exemplary, and the bridging members may extend between apparatuses in any manner. For example, a unit 202 may have a single bridging member extending therefrom, unit 204 may have two bridging members extending therefrom, and bridging unit 206 may have four bridging members extending therefrom. Each of these units 202, 204, 206, and others with different numbers of bridging units, may be utilized to form the system 200. Further, the bridging members may extend at angles, such as from unit 208, illustrated in FIGS. 8 and 9.

The system 200 thus connects a plurality of units together and holds them in relative positions, as desired by a user or as needed in a particular application. In an embodiment, units and bridging members may be connected and/or disconnected by users for forming any pattern of units as desired or needed.

The bridging members 212 may further have hinges, bends, slots, or other like features such that the system 200 so that the bridging members may bend. For example, as illustrated in FIGS. 8 and 9, the bridging members 212 may have slots 214 disposed therein allowing the bridging members to bend. Thus, the system 200 may be applied to a contoured surface and may roughly take the shape of the contoured surface. For example, if the system 200 is incorporated into a helmet, it may have to take a roughly spherical shape. The bridging members 212 may thus retain the units of the system 200 in their fixed positions, but slots 214 may allow each bridging member 212 to bend, allowing the system 200 to obtain the roughly spherical shape.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. An energy absorbing apparatus comprising:
a first planar element and a second planar element, the first planar element disposed adjacent to and in face-to-face relation with the second planar element;
a plurality of bendable arms, each of the bendable arms disposed between the first planar element and the second planar element, a first end of each of the bendable arms hingedly connected to the first planar element, and a second end of each of the bendable arms hingedly connected to the second planar element, each of the bendable arms further comprising a hinge at a midpoint between the first and second ends thereof and an aperture through each of the bendable arms at the midpoint thereof such that movement of the first planar element toward the second planar element causes the arms to bend outwardly; and
an energy storage element connected between the plurality of arms and sandwiched between the first and second planar elements, the energy storage element storing kinetic energy as potential energy when the first planar element moves toward the second planar element, the stored potential energy transforming into kinetic energy to move the first planar element away from the second planar element,
wherein the energy storage element comprises an elastic band comprising a central portion and a plurality of legs extending from the central portion outwardly, each of the plurality of legs having a terminal end, each terminal end having an upwardly extending tab and a downwardly extending tab, the terminal end of each of the plurality of legs extending through the aperture of each of the respective bendable arms, wherein the upwardly extending tab and the downwardly extending tab of each of the plurality of legs of the elastic band are held on an outside surface of each of the bendable arms via a hook.

2. The energy absorbing apparatus of claim 1 wherein the arms are pivotally connected at or near the perimeter of the first and second planar elements.

3. The energy absorbing apparatus of claim 1 wherein the first planar element is a first disk and the second planar element is a second disk.

4. The energy absorbing apparatus of claim 3 wherein the plurality of bendable arms comprises at least four arms disposed equidistantly around and pivotally connected to the perimeters of the first and second disks.

5. A system for absorbing energy comprising:
an article; and
at least one energy absorbing apparatus disposed on or within the article comprising a first planar element and a second planar element, the first planar element disposed adjacent to and in face-to-face relation with the second planar element, a plurality of bendable arms, each of the bendable arms disposed between the first planar element and the second planar element, a first end of each of the bendable arms hingedly connected to the first planar element, and a second end of each of the bendable arms hingedly connected to the second planar element, each of the bendable arms further comprising a hinge at a midpoint between the first and second ends thereof and an aperture through each of the bendable arms at the midpoint thereof such that movement of the first planar element toward the second planar element causes the arms to bend outwardly, and an energy storage element connected between the plurality of arms and sandwiched between the first and second planar elements, the energy storage element storing kinetic energy as potential energy when the first planar element moves toward the second planar element, the stored potential energy transforming into kinetic energy to move the first planar element away from the second planar element, wherein the energy storage element comprises an elastic band comprising a central portion and a plurality of legs extending from the central portion outwardly, each of the plurality of legs having a terminal end, each terminal end having an upwardly extending tab and a downwardly extending tab, the terminal end of each of the plurality of legs extending through the aperture of each of the respective bendable arms, wherein the upwardly extending tab and the downwardly extending tab of each of the plurality of legs of the elastic band are held on an outside surface of each of the bendable arms by a hook.

6. The system of claim 5 wherein the article is selected from the group consisting of footwear, a vest, a helmet, and a case for protecting electronic devices.

7. The system of claim 5 wherein the at least one energy absorbing apparatus is disposed within the article.

8. The system of claim 5 wherein the article comprises an outer layer of material, an inner layer of material, and the at least one energy absorbing apparatus is disposed between the outer and inner layers of material.

9. The system of claim 5 wherein the article comprises an energy absorbing material.

10. The system of claim 9 wherein the energy absorbing material is an energy absorbing foam.

11. The system of claim 8 wherein the outer layer of material is a bullet proof material.

12. The system of claim 11 wherein the outer layer of material is a rigid material, and the inner layer of material is a padded material.

* * * * *